Aug. 2, 1966     D. W. MAUGER     3,263,989
CONTROL MECHANISM FOR THE HOPPER RELEASE MEANS AND STOP
BAR OF PARTITION STRIP FEEDER MECHANISM
Filed Nov. 12, 1963     2 Sheets-Sheet 1
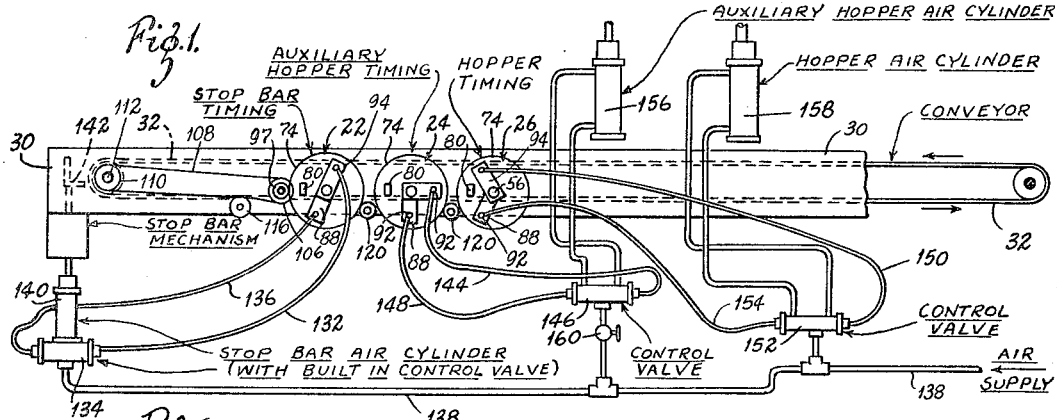
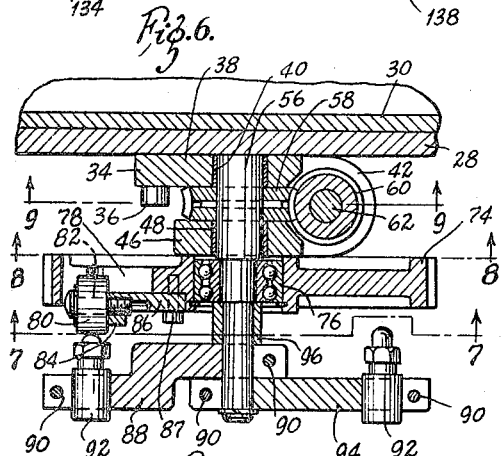
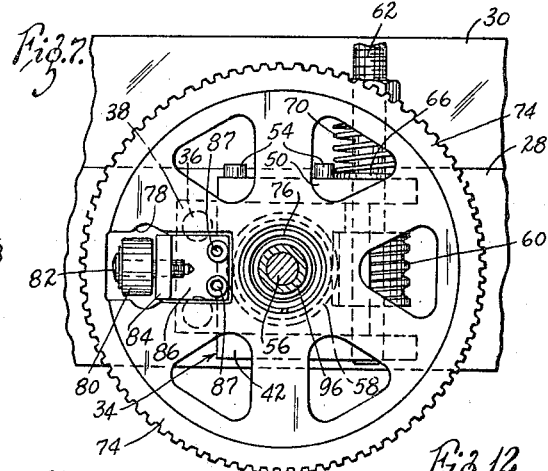
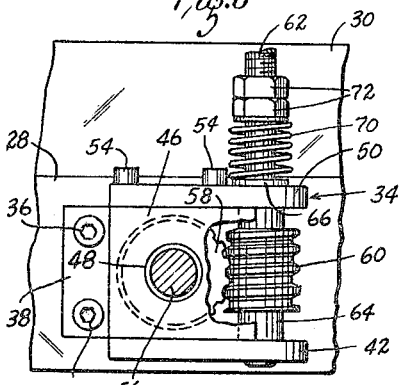
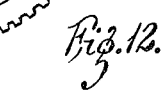
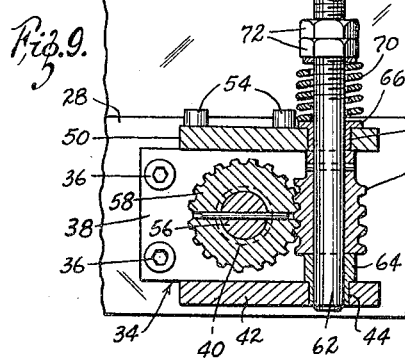
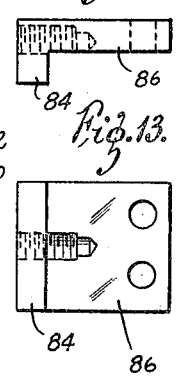
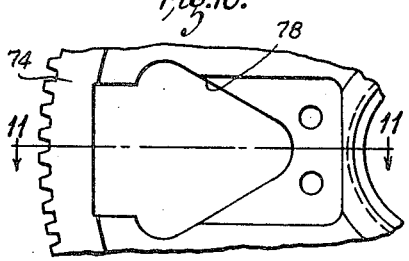
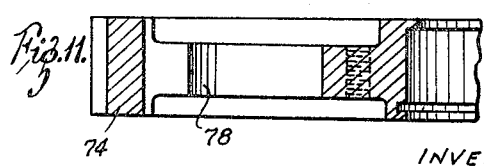
INVENTOR:
DAVID W. MAUGER,
BY Kingsland, Rogers, Ezell & Robbins
ATTORNEYS

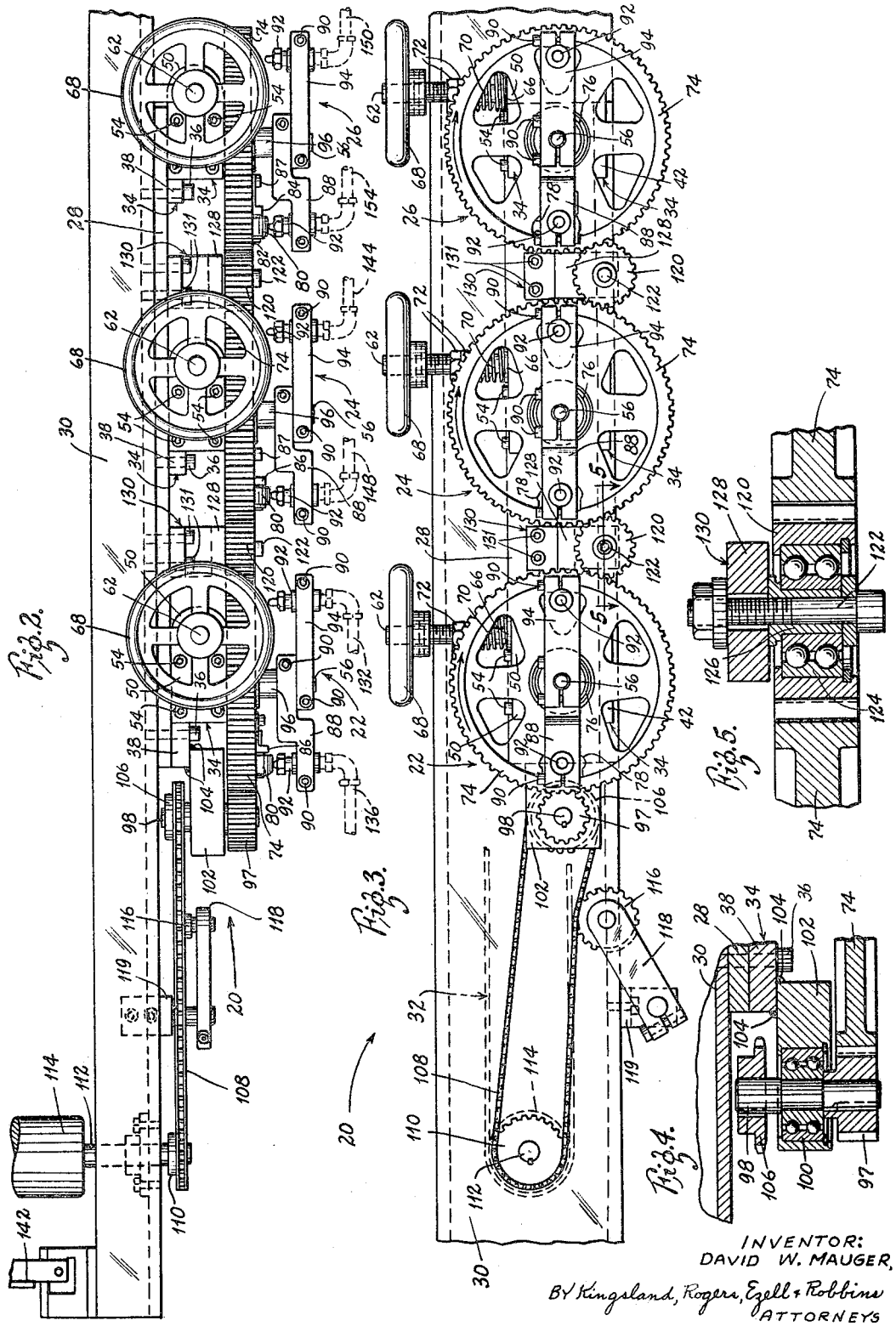

United States Patent Office 3,263,989
Patented August 2, 1966

3,263,989
CONTROL MECHANISM FOR THE HOPPER RELEASE MEANS AND STOP BAR OF PARTITION STRIP FEEDER MECHANISM
David W. Mauger, Mequon, Wis., assignor to U.S. Partition & Packaging Corporation, Milwaukee, Wis., a corporation of Wisconsin
Filed Nov. 12, 1963, Ser. No. 322,783
9 Claims. (Cl. 271—8)

The present invention relates generally to the partition assembling art, and more particularly to novel control mechanism for precut partition strip feeders for quickly and accurately changing or adjusting the timing relationship of the release of precut partition strips from hopper means and the action of a stop bar adapted to successively align sets of parallel partition strips prior to being fed to and through a partition assembly zone.

For many years prior to the present invention, changing or adjusting the preset timing of the hopper release mechanism of precut partition strip feeders and the stop bar thereof has been laborious, time consuming, and expensive in down time and labor. Adjustments become necessary for many reasons, as faulty presetting, slipping of control parts, and the like. A change of timing is required when shorter or longer partition strips are used, conveyor speed is changed, or the like. Such changes or adjustments have required stopping of the whole feeding and assembling mechanism, often repeated stopping in obtaining proper timing.

Therefore, an object of the present invention is to provide novel control mechanism for the hopper release means and stop bar of partition strip feeder mechanism which overcomes the long existing problem in respect thereto stated above.

In brief, the disclosed embodiment of the present invention includes a base on which are mounted three timing gears adapted to be simultaneously continuously driven from a feeder conveyor, or otherwise. Operatively associated with each gear for rotation therewith is a roller. Two poppet valves are mounted for actuation by each roller each revolution of the gear, the several rollers thereby effecting timed actuation of a feeder's hopper release means and stop bar through the usual pneumatic lines, control valves and air cylinders. Operatively associated with each pair of poppet valves is a readily accessible hand wheel for simultaneously changing the positions thereof annularly. The timing of the actuation of the hopper release means in respect to the actuation of the stop bar is quickly and accurately made through use of the hand wheels without shut down of the feeder and assembler.

Another object of the present invention is to provide novel control mechanism for the hopper release means and stop bar of partition strip feeder mechanism which can be employed to adjust or change the initial relationship therebetween without shutting down the feeder and assembly mechanisms.

Another object of the present invention is to provide novel control mechanism for the hopper release means and stop bar of partition strip feeder mechanism, which can be employed to provide a very accurate timing change while visually observing the assembly area with feeder and assembly mechanisms running, enabling the operator to see the direction and magnitude of the timing change being made, whereby with a series of successive such adjustments, he can rapidly arrive at a final accurate timing setting.

Another object of the present invention is to provide novel control mechanism for the hopper release means and stop bar of partition strip feeder mechanism which reduces to a minimum shut-down time heretofore required for adjustment or change of the relative movements of hopper release and stop bar.

Another object of the present invention is to provide novel control mechanism for the hopper release means and stop bar of partition strip feeder mechanism which can be effectively employed by operating personnel with minimum instructions.

The foregoing and other objects and advantages are apparent from the folowing description taken with the accompanying drawings, in which:

FIGURE 1 is a diagrammatic layout indicating the relationship of the present invention to the pneumatic lines to the stop bar and hopper release means;

FIGURE 2 is a top plan view of a control mechanism incorporating the teachings of the present invention shown mounted against one side of the conveyor of a partition feeder;

FIGURE 3 is a side elevational view thereof;

FIGURE 4 is an enlarged horizontal cross-sectional view through the driven sprocket and gear;

FIGURE 5 is an enlarged horizontal cross-sectional view taken on substantially the line 5—5 of FIGURE 3;

FIGURE 6 is an enlarged horizontal cross-sectional view taken diametrically through one large timing gear and associated parts;

FIGURE 7 is a vertical cross-sectional view taken on substantially the line 7—7 of FIGURE 6;

FIGURE 8 is a vertical cross-sectional view taken on substantially the line 8—8 of FIGURE 6, a portion of the spacer member being broken away for illustration of details;

FIGURE 9 is a vertical cross-sectional view taken on substantially the line 9—9 of FIGURE 6;

FIGURE 10 is a fragmentary view illustrating details of the large gears;

FIGURE 11 is a horizontal cross-sectional view taken on substantially the line 11—11 of FIGURE 10;

FIGURE 12 is an end view of a roller mounting bracket; and

FIGURE 13 is a bottom plan view thereof.

Referring to the drawings more particularly by reference numerals, 20 indicates generally a control mechanism constructed in accordance with the principles of the present invention, which is adapted for mounting on and use with the feeder shown in United States Patent No. 2,984,480, or other feeder of this type. As illustrated, the control mechanism 20 includes a stop bar control unit 22, an auxiliary hopper release means control unit 24, and hopper release means control unit 26. The control units 22, 24 and 26 are identical, hence, only one will be described in detail, the same reference numerals indicating like parts in all three.

An elongated mounting plate 28 is provided of sufficient length to receive the three control units 22, 24 and 26. The mounting plate 28 is secured by suitable bolts or screws to the side frame 30 of the conveyor 32 of the feeder with which the control mechanism 20 is associated. A mounting block 34 of the configuration clearly shown in FIGURES 6, 8 and 9, is mounted against the plate 28 by suitable screws 36. The mounting block 34 includes a vertical mounting wall portion 38 having an annular opening 40, an integral bottom plate portion 42 having an opening 44, an integral vertical wall portion 46 opposed to the mounting portion 38 and having an opening 48 therethrough, and a separate top plate 50 having an opening 52 therethrough aligned with the opening 44 in the bottom portion 42 which is secured to the vertical portions 38 and 46 by suitable screws 54.

A shaft 56 of the configuration clearly shown in FIGURE 6 is mounted in the aligned openings 40 and 48, and extends outwardly at right angles to the mounting plate 28. A poppet adjusting worm gear 58 is pinned to the shaft 56 for movement therewith (FIGS. 6 and 9). A worm 60 is in mesh with the worm gear 58 and is pinned to a vertically disposed shaft 62 which is mounted in the openings 44 and 52 by sleeve members 64 and 66. The shaft 62 extends above the mounting block 34 and receives on its upper end a hand wheel 68 (FIGS. 2, 3). To maintain the shaft 62 in selected position, there is provided a heavy compression spring 70 which is maintained in selective operative position by lock nuts 72.

A large timing gear 74 is rotatably mounted on the shaft 56 by means of roller bearings 76. The timing gear 74 has cutouts therein including one cutout 78 of the configuration clearly shown in FIGURES 10 and 11. A poppet engaging roller 80 is mounted in the opening 78 on a stub shaft 82 mounted in the flange 84 of a bracket 86 secured to the timing gear 74 by suitable machine screws 87 (FIGS. 6 and 7).

An inner poppet valve arm 88 of the offset configuration shown in FIGURES 2, 3 and 6 is secured to the shaft 56 by means of a split end and machine screw 90. Similarly secured adjacent the free end of the arm 88 is a poppet valve 92 of conventional structure, such as a Galland-Henning Nopak type P-2 cam control poppet bleed type. An outside poppet valve arm 94 is similarly mounted on the shaft 56 and, in like manner, supports a conventional poppet valve 92 (FIGS. 2, 3 and 6). A sleeve 96 spaces the arm 88 from the gear 74.

The gear 74 of the control unit 22 is driven by a small gear 97 which is keyed to, for rotation with, a stub shaft 98 rotatably mounted by means of a ball-bearing unit 100 in a bearing block 102 welded as at 104 to the end of the adjacent mounting block 34 (FIGS. 2 and 4). Keyed to the inner end of the stub shaft 98 is a sprocket 106. The sprocket 106 is driven through a chain 108 by a second sprocket 110 keyed to the outer end of the driven shaft 112 of the conveyor roller 114 (FIGS. 2 and 3). An idler sprocket 116 rotatably mounted on a stub shaft at the end of an arm 118 secured to a stub shaft mounted on a bracket 119 secured to and depending from the frame 30 takes up slack in the chain 108.

For transferring the rotary motion of the gear 74 of the control unit 22 to the other gears 74, there are provided two idler gears 120, each meshing with two gears 74 and each being rotatably mounted on a stub shaft 122 through a ball-bearing unit 124 and a sleeve 126 (FIGS. 2, 3 and 5). Each stub shaft 122 is secured to the outer flange 128 of a Z-bracket 130 mounted against the plate 28 by bolts or screws 131.

In FIGURE 1 is illustrated diagrammatically the operative relation of the control mechanism 20 with the necessary pneumatic lines, valves, and air cylinders associated with the stop bar and hopper release means of the feeder. An air line 132 connects one poppet valve 92 of control unit 22 with one side of a standard control valve 134, such as a Schrader No. 31504–9000 double air pilot valve bleed type, an air line 136 connecting the other poppet valve 92 with the other side of the control valve 134. An air supply line 138 is connected into the valve 134, the latter being directly associated with a standard air cylinder 140, such as a Schrader square-end double-acting cylinder of predetermined stroke, which is mechanically connected to a stop bar 142 for positive reciprocation thereof. Similarly, air lines 144 and 148 connect a standard control valve 146, like control valve 134, with the poppet valves 92 of the control unit 24, and air lines 150 and 154 connect a standard control valve 152, such as a Galland-Henning Nopak V–250–R air control valve, with the poppets 92 of the control unit 26. The valves 146 and 152 are operatively connected with standard air cylinders 156 and 158, respectively, which are operatively connected with the partition strip release means of an auxiliary hopper and of the regular hoppers, respectively, of the feeder. The air cylinder 156 may be a Schrader with predetermined stroke like the air cylinder 140 and the air cylinder 158 or Galland-Henning Nopak Model E double-acting cylinder. When an auxiliary hopper is not in use, air to the control valve of the control unit 24 is shut off by a manual valve 160. The several valves 134, 146 and 152 and air cylinders 140, 156 and 158 are commercial items readily available on the open market.

In operation, before starting the feeder, the up and down cycle of the stop bar 142 is established by manually setting the positions of the poppet arms 88 and 94 of the control unit 22. Similarly, the release and close cycle of the auxiliary and regular hopper release means are established by manually setting the positions of the poppet arms 88 and 94 of the control units 24 and 26, respectively. Thereupon, the feeder is started and the cycles of the stop bar and the two hopper release means are synchronized quickly by manipulation of the several hand wheels 68. Thereafter, should this timing go off, or should it be necessary to change the timed relationship of the stop bar and hopper release means, it can be quickly and accurately accomplished through the hand wheels 68 while the feeder is running, thereby saving down time and labor, which are expensive. The hand wheels 68 and associated parts effect simultaneous rotary displacement of the arms 88 and 94 from their initial positions.

It is, of course, clear from the above detailed description that the timing gears 74 rotate at a constant speed, and that each gear 74 actuates its pair of poppet valves 92 to release air each revolution through the rollers 80.

It is manifest that there has been provided a control mechanism which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination with hopper release means and the stop bar of a precut partition strip feeder, control mechanism for the hopper release means and the stop bar of a precut partition strip feeder comprising means for operatively actuating the hopper release means to release partition strips, means for operatively actuating the stop bar, said last two means being presettable to function in timed relation, and independent means for selectively changing the initial timed relation of the said two means, said independent means being selectively operable to effect the desired timing change without shutting down the feeder.

2. The combination of claim 1 in which each of said independent means includes a manually operable member readily accessible by operating personnel.

3. The combination of claim 2 in which each member comprises a reversible hand wheel.

4. The combination of claim 3 in which said hand wheels can be rotated at the same time.

5. The combination of claim 4 in which said control mechanism is mounted on the feeder in position for an operator to view the partition drop and the partition stop while manipulating said hand wheels.

6. In combination, control mechanism for the stop bar of a partition feeder comprising pneumatic means for raising and lowering a stop bar including a control valve, means for cyclically actuating said control valve to raise and lower the stop bar, and means for altering the actuation cycle to change the timing of the stop bar without shutting down the feeder.

7. The combination of claim 6 in which said means for altering the actuation cycle is accessible for manual manipulation during operation of the feeder.

8. In combination, control mechanism for hopper release means of a partition feeder comprising pneumatic means for releasing and closing a hopper release means including a control valve, means for cyclically actuating said control valve to release and close the hopper release means, and means for altering the actuation cycle to change the timing of the hopper release means without shutting down the feeder.

9. The combination of claim 8 in which said means for altering the actuation cycle is accessible for manual manipulation during operation of the feeder.

References Cited by the Examiner

UNITED STATES PATENTS

| | | | |
|---|---|---|---|
| 2,771,292 | 11/1956 | Emerson | 271—50 |
| 2,984,480 | 5/1961 | Cunningham | 271—9 |
| 3,075,328 | 1/1963 | Willbrandt | 53—51 |

M. HENSON WOOD, JR., *Primary Examiner.*

R. A. SCHACHER, *Assistant Examiner.*